United States Patent
Wang et al.

(10) Patent No.: US 8,331,606 B2
(45) Date of Patent: Dec. 11, 2012

(54) DIAPHRAGM AND LOUDSPEAKER USING THE SAME

(75) Inventors: Jia-Ping Wang, Beijing (CN); Liang Liu, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 312 days.

(21) Appl. No.: 12/824,386

(22) Filed: Jun. 28, 2010

(65) Prior Publication Data

US 2011/0026750 A1 Feb. 3, 2011

(30) Foreign Application Priority Data

Jul. 31, 2009 (CN) .......................... 2009 1 0108865

(51) Int. Cl.
*H04R 1/00* (2006.01)

(52) U.S. Cl. .......................... 381/423; 977/742; 977/949

(58) Field of Classification Search .................. 977/742, 977/902, 949; 381/394, 423
See application file for complete search history.

(56) References Cited

U.S. PATENT DOCUMENTS

| | | | |
|---|---|---|---|
| 4,312,118 A | 1/1982 | Saik et al. | |
| 6,597,798 B1 * | 7/2003 | Nakazono et al. | 381/410 |
| 6,639,993 B2 * | 10/2003 | Kemmerer et al. | 381/397 |
| 6,808,746 B1 | 10/2004 | Dai et al. | |
| 7,045,108 B2 | 5/2006 | Jiang et al. | |
| 7,437,938 B2 * | 10/2008 | Chakraborty | 73/714 |
| 8,068,626 B2 * | 11/2011 | Jiang et al. | 381/164 |
| 8,073,164 B2 * | 12/2011 | Jiang et al. | 381/164 |
| 2004/0020681 A1 | 2/2004 | Hjortstam et al. | |
| 2004/0053780 A1 | 3/2004 | Jiang et al. | |
| 2008/0170982 A1 | 7/2008 | Zhang et al. | |
| 2008/0248235 A1 | 10/2008 | Feng et al. | |
| 2008/0260188 A1 * | 10/2008 | Kim | 381/190 |
| 2008/0299031 A1 | 12/2008 | Liu et al. | |
| 2008/0304694 A1 | 12/2008 | Hayashi | |
| 2009/0045005 A1 * | 2/2009 | Byon et al. | 181/167 |
| 2009/0068448 A1 | 3/2009 | Liu et al. | |
| 2009/0074228 A1 | 3/2009 | Mango, III et al. | |
| 2009/0153502 A1 | 6/2009 | Jiang et al. | |
| 2009/0155467 A1 | 6/2009 | Wang et al. | |
| 2009/0160799 A1 | 6/2009 | Jiang et al. | |

(Continued)

FOREIGN PATENT DOCUMENTS

CN 2488247 4/2002

(Continued)

OTHER PUBLICATIONS

"Flexible, Stretchable, Transparent Carbon Nanotube Thin Film Loudspeakers" Lin Xiao et al., Nano Letters, Oct. 29, 2008.*

(Continued)

*Primary Examiner* — Jeffrey Donels
(74) *Attorney, Agent, or Firm* — Altis Law Group, Inc.

(57) ABSTRACT

A diaphragm includes a diaphragm matrix and at least one reinforcing structure composited with the diaphragm matrix. The at least one reinforcing structure includes at least one freestanding carbon nanotube structure. A loudspeaker includes a magnetic circuit defining a magnetic gap; a bobbin located in the magnetic gap; a voice coil wound on the bobbin; and a diaphragm. The diaphragm includes an inner rim fixed to the bobbin a diaphragm matrix, and at least one reinforcing structure composited with the diaphragm matrix. The at least one reinforcing structure includes at least one freestanding carbon nanotube structure.

18 Claims, 15 Drawing Sheets

U.S. PATENT DOCUMENTS

| | | | |
|---|---|---|---|
| 2009/0197082 A1 | 8/2009 | Jiang et al. | |
| 2009/0268559 A1* | 10/2009 | Jiang et al. | 367/140 |
| 2009/0272935 A1 | 11/2009 | Hata et al. | |
| 2009/0296528 A1* | 12/2009 | Jiang et al. | 367/140 |
| 2010/0046784 A1* | 2/2010 | Jiang et al. | 381/386 |
| 2010/0188934 A1* | 7/2010 | Qian et al. | 367/140 |

FOREIGN PATENT DOCUMENTS

| | | |
|---|---|---|
| CN | 101321410 | 12/2008 |
| CN | 101381071 | 3/2009 |
| JP | 60-27298 | 2/1985 |
| JP | 63-49991 | 12/1988 |
| JP | 7-138838 | 5/1995 |
| JP | 2002-171593 | 6/2002 |
| JP | 2002-542136 | 12/2002 |
| JP | 2003-319490 | 11/2003 |
| JP | 2004-32425 | 1/2004 |
| JP | 2004-107196 | 4/2004 |
| JP | 2006-147801 | 6/2006 |
| JP | 2007-182352 | 7/2007 |
| JP | 2007-290908 | 11/2007 |
| JP | 2009-144158 | 7/2009 |
| JP | 2009-146420 | 7/2009 |
| JP | 2009-184910 | 8/2009 |
| WO | 2007043837 | 4/2007 |

OTHER PUBLICATIONS

"Hot nanotube sheets produce music on demand," New Scientist, Oct. 31, 2008.*

"Nanotubes made of carbon find an unexpected use," The Economist, Nov. 20, 2008.*

Xiao et al.,Flexible, Stretchable, Transparent Carbon Nanotube Thin Film Loudspeakers,Nanoletter, vol. 8; No. 12, 4539-4545.

* cited by examiner

DIAPHRAGM AND LOUDSPEAKER USING THE SAME

CROSS-REFERENCE TO RELATED APPLICATIONS

This application claims all benefits accruing under 35 U.S.C. §119 from China Patent Application No. 200910108865.9, filed on 2009 Jul. 31, in the China Intellectual Property Office, the contents of which are hereby incorporated by reference. This application is related to commonly-assigned application entitled, "DIAPHRAGM AND LOUDSPEAKER USING THE SAME", filed Jun. 28, 2010, Ser. No. 12/824,390.

BACKGROUND

1. Technical Field

The present disclosure relates to diaphragms and loudspeakers and, particularly, to a diaphragm based on carbon nanotube and a loudspeaker using the same.

2. Description of Related Art

A loudspeaker is an acoustic device transforming received electric signals into sounds. There are different types of loudspeakers that can be categorized accordingly to their working principle, such as electro-dynamic loudspeakers, electromagnetic loudspeakers, electrostatic loudspeakers and piezoelectric loudspeakers. Among the various types, the electro-dynamic loudspeakers have simple structures, good sound qualities, low costs, and thus, are most widely used.

The electro-dynamic loudspeaker typically includes a diaphragm, a bobbin, a voice coil, a damper, a magnet, and a frame. The voice coil is an electrical conductor, and is placed in the magnetic field of the magnet. By applying an electrical current to the voice coil, a mechanical vibration of the diaphragm is produced by the interaction between the electromagnetic field produced by the voice coil and the magnetic field of the magnets, thus producing sound waves by kinetically pushing the air. The diaphragm reproduces the sound pressure waves, corresponding to the original input electric signals.

To evaluate the loudspeaker, sound volume is a decisive factor. The sound volume of the loudspeaker relates to the input power of the electric signals and the conversion efficiency of the energy. However, when the input power is increased to certain levels, the diaphragm could deform or even break, thereby causing audible distortion. Therefore, the strength and Young's modulus of the diaphragm are determining factors of a rated power of the loudspeaker. The rated power is the highest input power by which the loudspeaker can produce sound without audible distortion. Additionally, the lighter the weight per unit area of the diaphragm, the smaller the energy required for causing the diaphragm to vibrate, the higher the energy conversion efficiency of the loudspeaker, and the higher the sound volume produced by the same input power.

Accordingly, the higher the strength and the Young's modulus, and the smaller the density of the diaphragm, the higher the efficiency and volume of the loudspeaker.

However, the material of the diaphragm is usually polymer, metal, ceramic, or paper. The polymer and the paper have relatively low strength and Young's modulus. The metal and ceramic have relatively high weight. Therefore, the rated power of the conventional loudspeakers is relatively low. In general, the rated power of a small sized loudspeaker is only 0.3 W to 0.5 W. In another aspect, the density of the conventional diaphragms is usually large, thereby restricting the the energy conversion efficiency. Therefore, to increase the rated power and the energy conversion efficiency of the loudspeaker and to increase the sound volume, the improvement of the loudspeaker is focused on increasing the strength and Young's modulus and decreasing the density of the diaphragm. That is, to increase the specific strength (i.e., strength/density) and the specific Young's modulus (i.e., Young's modulus/density) of the diaphragm.

Carbon nanotubes (CNT) are a novel carbonaceous material having extremely small size, light weight, and extremely large specific surface area. Carbon nanotubes have received a great deal of interest since the early 1990s and have been widely used in a plurality of fields, because of their interesting and potentially useful electrical and mechanical properties. PCT patent application WO2007043837 published on Apr. 19, 2007 discloses a diaphragm of a loudspeaker using carbon nanotubes dispersed in a matrix material by the addition of surfactant, stearic acid or fatty acid, to improve the strength of the diaphragm. However, the carbon nanotubes are in a powder form. Due to the large specific surface area of the carbon nanotube, the carbon nanotube powder aggregates easily in the matrix material. Thus, the larger the ratio of the carbon nanotubes in the matrix material, the more difficult it is to disperse the carbon nanotubes. Further, the addition of the surfactant, stearic acid or fatty acid introduces impurities into the diaphragm. The dispersion of the carbon nanotube relates to complicated reaction processes.

What is needed, therefore, is to provide a diaphragm and a loudspeaker using the same with high strength and Young's modulus.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
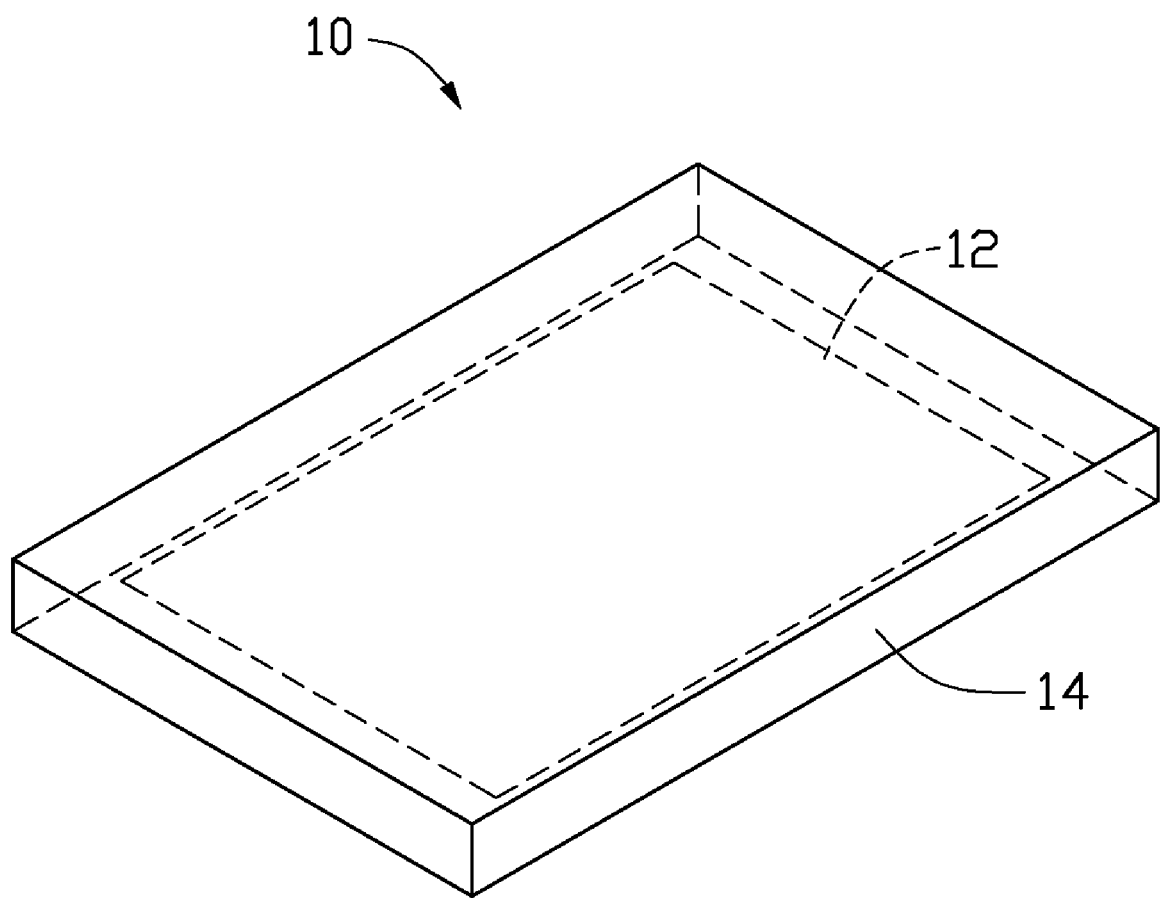
FIG. 1 is a schematic structural view of an embodiment of a diaphragm including one carbon nanotube film.

Referring to FIG. 1, one embodiment of a diaphragm 10 includes a diaphragm matrix 14 and one or more reinforcing structures 12 forming a composite structure. More specifically, the reinforcing structure 12 includes a plurality of carbon nanotubes. The adjacent carbon nanotubes define a plurality of micropores. The material of the diaphragm matrix 14 infiltrates into the plurality of the micropores of the reinforcing structure 12, thereby forming a composite structure. The reinforcing structure 12 can be completely covered by the material of the diaphragm matrix 14, and can be located inside the diaphragm matrix 14. The reinforcing structure 12 can also be partially exposed from the surface of the diaphragm matrix 14. The diaphragm 10 is a thin two dimensional structure. The plurality of the reinforcing structures 12 can be spaced from each other or in contact with each other. It is noteworthy that, although the diaphragm 10 shown in FIG. 1 has a rectangular shape, the diaphragm 10 can be made into other shapes, such as circular, elliptical, or triangular, to adapt to the actual needs of a loudspeaker. The shape of the diaphragm 10 is not limited.

The material of the diaphragm matrix 14 can be selected from metal, diamond, ceramic, paper, cellulose, or polymer, such as polypropylene, polyethylene terephthalate (PET), polyetherimide (PEI), polyethylene naphthalate (PEN), polyphenylene sulfide (PPS), polyvinyl chloride (PVC), polystyrene (PS), or polyethersulfone (PES).

The reinforcing structure 12 is a freestanding structure, and includes a plurality of carbon nanotubes. The term "freestanding structure" includes, but not limited to, a structure that does not have to be supported by a substrate. For example, a freestanding structure can sustain the weight of itself when it is hoisted by a portion thereof without any significant damage to its structural integrity. The carbon nanotubes are joined to each other due to the van der Waals attractive force, thereby forming a net structure, and enabling a shape of the reinforcing structure 12. In the reinforcing structure 12, the carbon nanotubes are orderly or disorderly aligned. The disorderly aligned carbon nanotubes are arranged along many different directions. The number of carbon nanotubes arranged along each different direction can be almost the same (e.g. uniformly disordered); and/or entangled with each other. The orderly aligned carbon nanotubes are arranged in a consistently systematic manner, e.g., most of the carbon nanotubes are arranged approximately along a same direction or have two or more sections within each of which the most of the carbon nanotubes are arranged approximately along a same direction (different sections can have different directions). The thickness of the reinforcing structure 12 can be in a range from about 0.5 nanometers to about 1 millimeter. The carbon nanotubes in the reinforcing structure 12 can be selected from single-walled, double-walled, and/or multi-walled carbon nanotubes. Diameters of the single-walled carbon nanotubes approximately range from 0.5 nanometers to 50 nanometers. Diameters of the double-walled carbon nanotubes approximately range from 1 nanometer to 50 nanometers. Diameters of the multi-walled carbon nanotubes approximately range from 1.5 nanometers to 50 nanometers. In one embodiment, most of the carbon nanotubes in the reinforcing structure 12 are aligned along the same direction.

Figure 2:
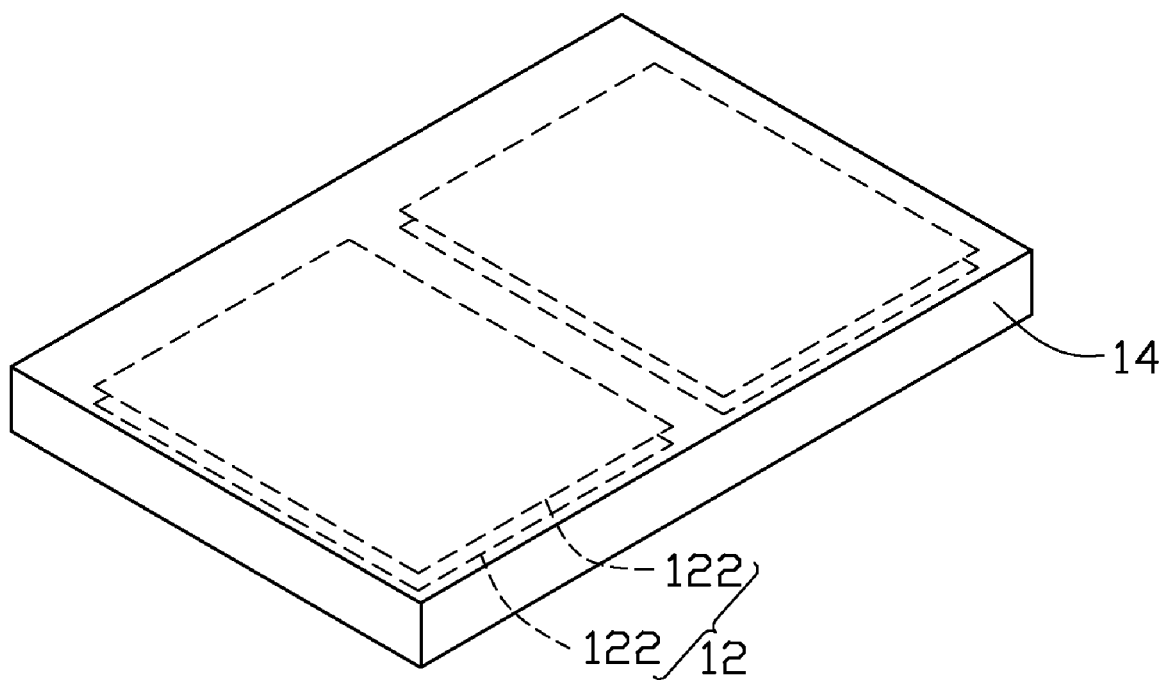
FIG. 2 is a schematic structural view of another embodiment of a diaphragm including two or more carbon nanotube films.

In the first embodiment, the reinforcing structure 12 is a freestanding carbon nanotube structure. The carbon nanotube structure can have a planar shape or a linear shape. The carbon nanotube structure consists of a plurality of uniformly distributed carbon nanotubes. The carbon nanotubes are combined by van der Waals attractive force therebetween. It is noteworthy that, the carbon nanotube structure can be seen as a substantially pure structure consisting mostly of carbon nanotubes, and the carbon nanotube can only include carbon element. The carbon nanotube structure can be one or more carbon nanotube films, one or more carbon nanotube wire structures, or the combinations thereof. The carbon nanotube wire structure includes at least one carbon nanotube wire. When the carbon nanotube wire structure includes a plurality of carbon nanotube wires, the carbon nanotube wires can be parallel to each other to form a bundle-like structure or twisted with each other to form a twisted structure. The bundle-like structure and the twisted structure are two kinds of linear shaped carbon nanotube structure. The plurality of carbon nanotube wire structures can be woven together to from a planar shaped carbon nanotube structure. Referring to FIG. 2, when the carbon nanotube structure includes a plurality of carbon nanotube films 122, the plurality of carbon nanotube films 122 can be stacked together and/or coplanar arranged to form the planar shaped carbon nanotube structure.

More specifically, the reinforcing structure 12 and the diaphragm matrix 14 can be composited together as the following manners.

The carbon nanotube structure can include at least one carbon nanotube film 122. Referring to FIG. 2, the plurality of carbon nanotube films 122 can be stacked together or coplanar arranged inside the diaphragm matrix 14. The plurality of carbon nanotube films 12 can be in contact with each other or spaced from each other in the diaphragm matrix 14.

The carbon nanotube structure can include at least one carbon nanotube wire structure. The carbon nanotube wire structure can be distributed in the entire area of the diaphragm matrix 14, or selectively arranged at a certain region of the diaphragm matrix 14 that needs reinforcement.

Figure 3:
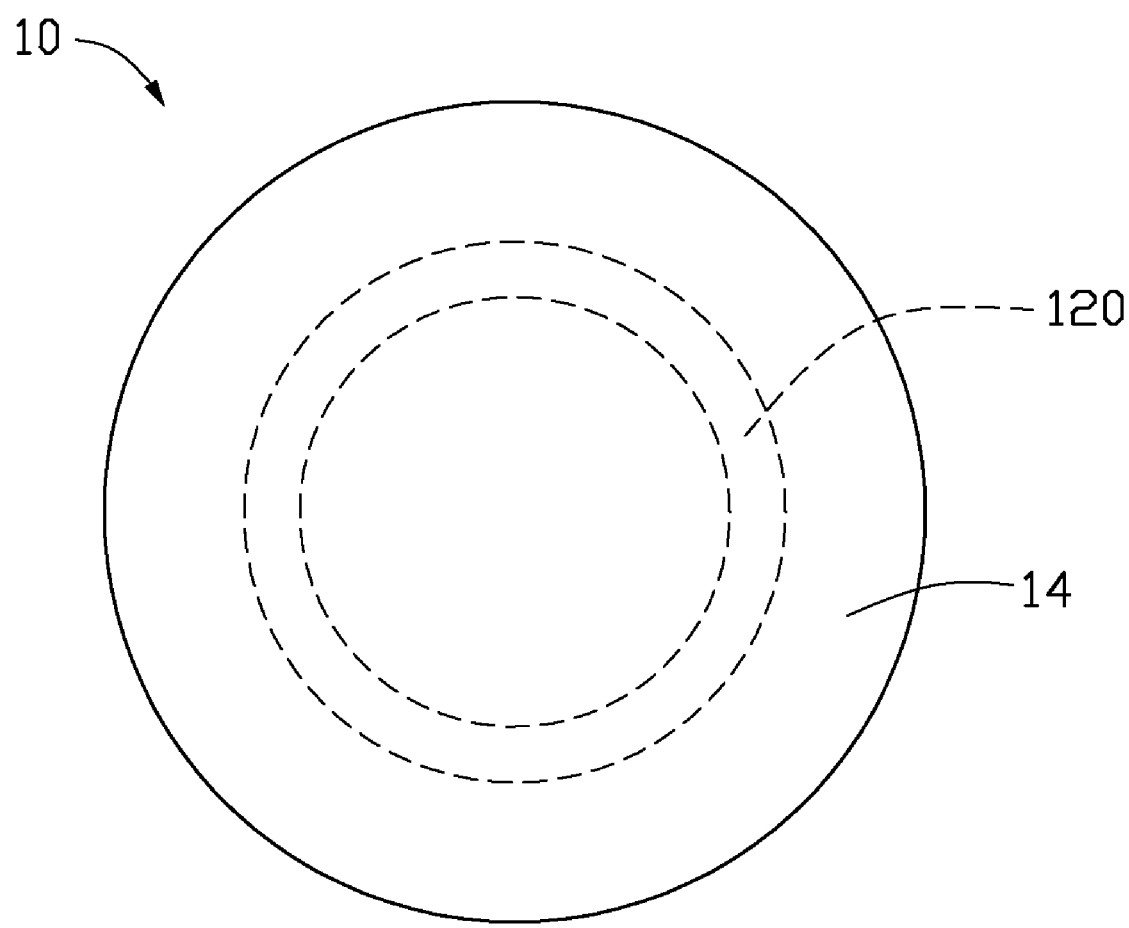
FIG. 3 is a schematic top view of another embodiment of a diaphragm including a circle shaped carbon nanotube wire structure.

Referring to FIG. 3, the carbon nanotube wire structure 120 can be deformed to form a circle and can be disposed inside the diaphragm matrix 14. The circle shaped carbon nanotube wire structure 120 is concentric to the round diaphragm matrix 14.

Figure 4:
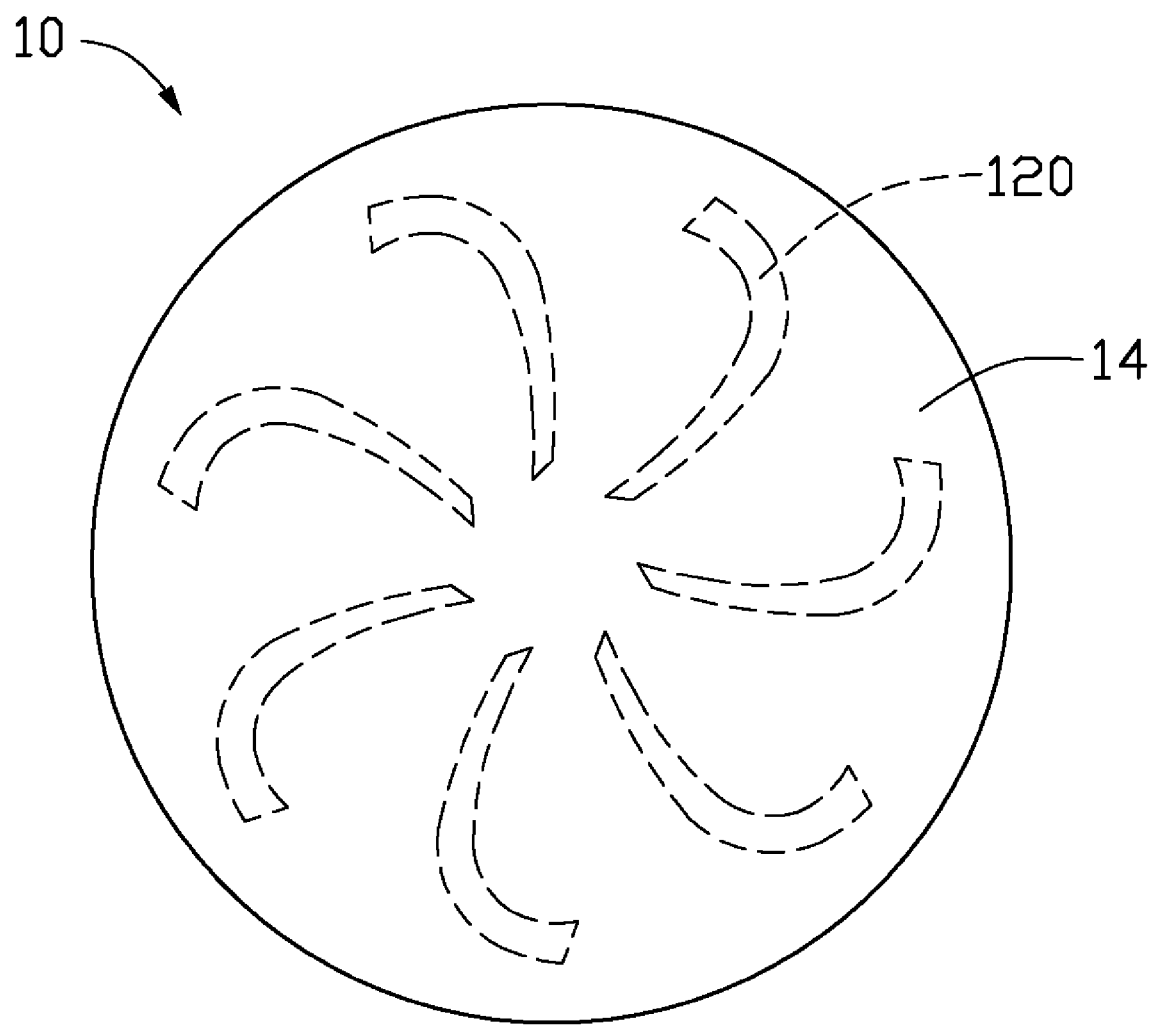
FIG. 4 is a schematic top view of another embodiment of a diaphragm including radiated arranged carbon nanotube wire structures.

Referring to FIG. 4, the diaphragm 10 can include a plurality of carbon nanotube wire structures 120 arranged in the diaphragm matrix 14 in a radial-like manner. The radial center is also the center of the round diaphragm matrix 14. The carbon nanotube wire structures 120 can be straight or curved.

It is noteworthy that, the arrangement of the carbon nanotube wire structures 120 is not limited to the above-mentioned manners. For example, the diaphragm 10 can include a spiral shaped carbon nanotube wire structure 120 inside the diaphragm matrix 14. The carbon nanotube wire structure 120 can increase the strength and the Young's modulus, especially in a specific location of the diaphragm 10 that needs reinforcement.

Figure 5:
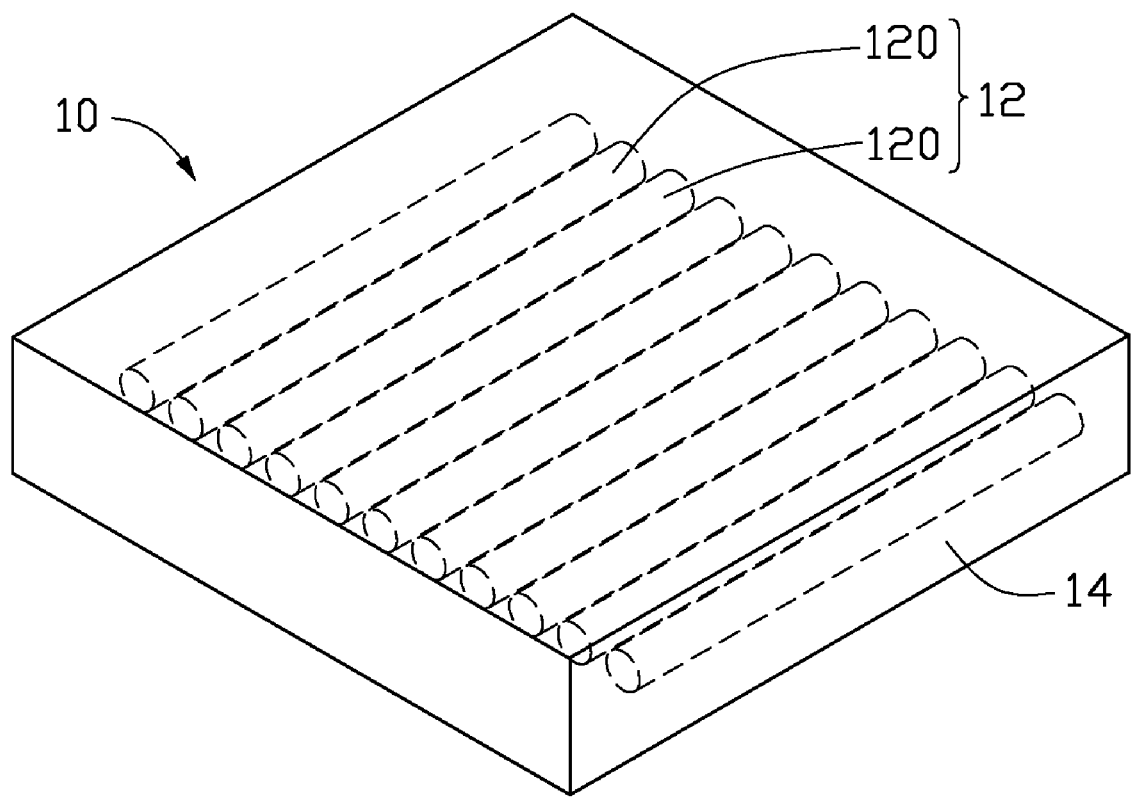
FIG. 5 is a schematic top view of another embodiment of a diaphragm including a plurality of carbon nanotube wire structures substantially parallel to each other.
Figure 6:
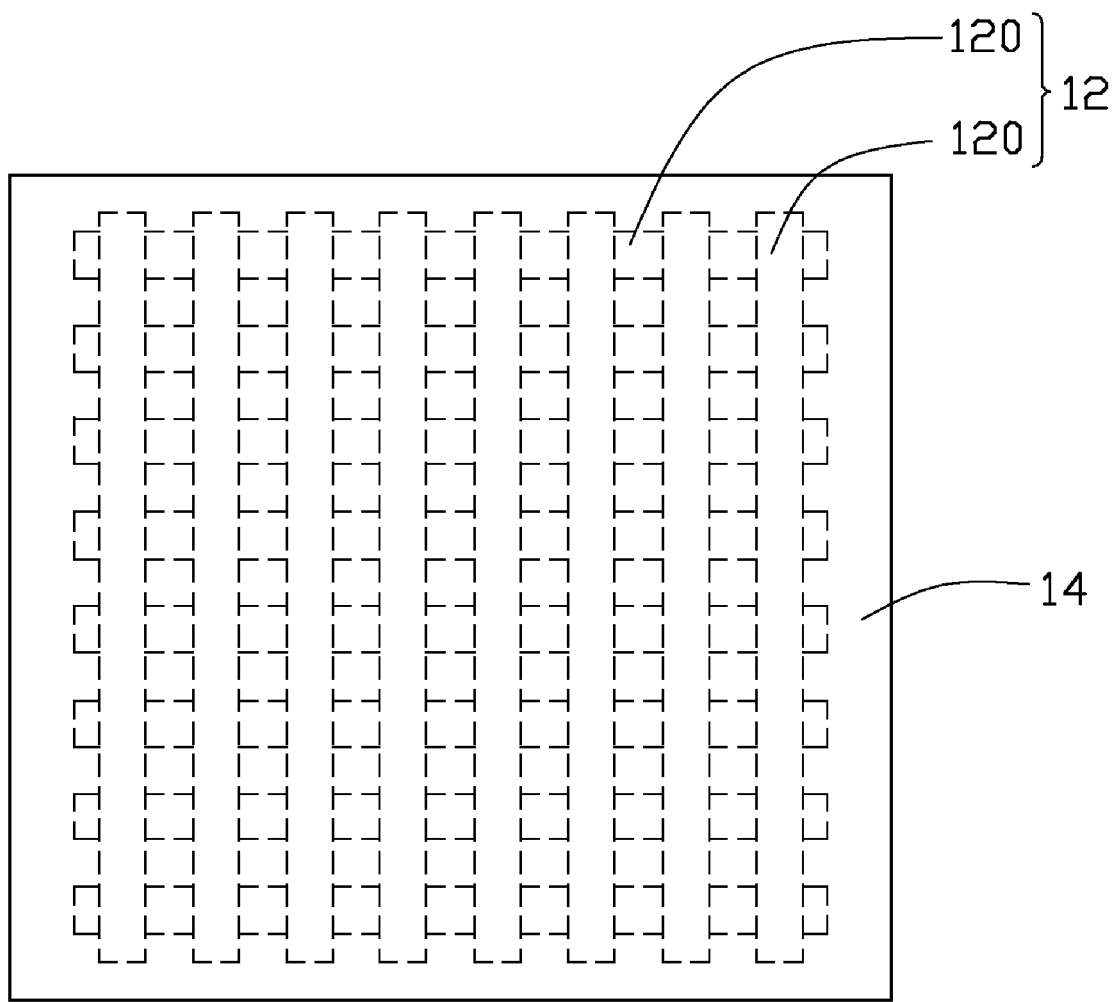
FIG. 6 is a schematic top view of another embodiment of a diaphragm including two groups of carbon nanotube wire structures crossing each other.
Figure 7:
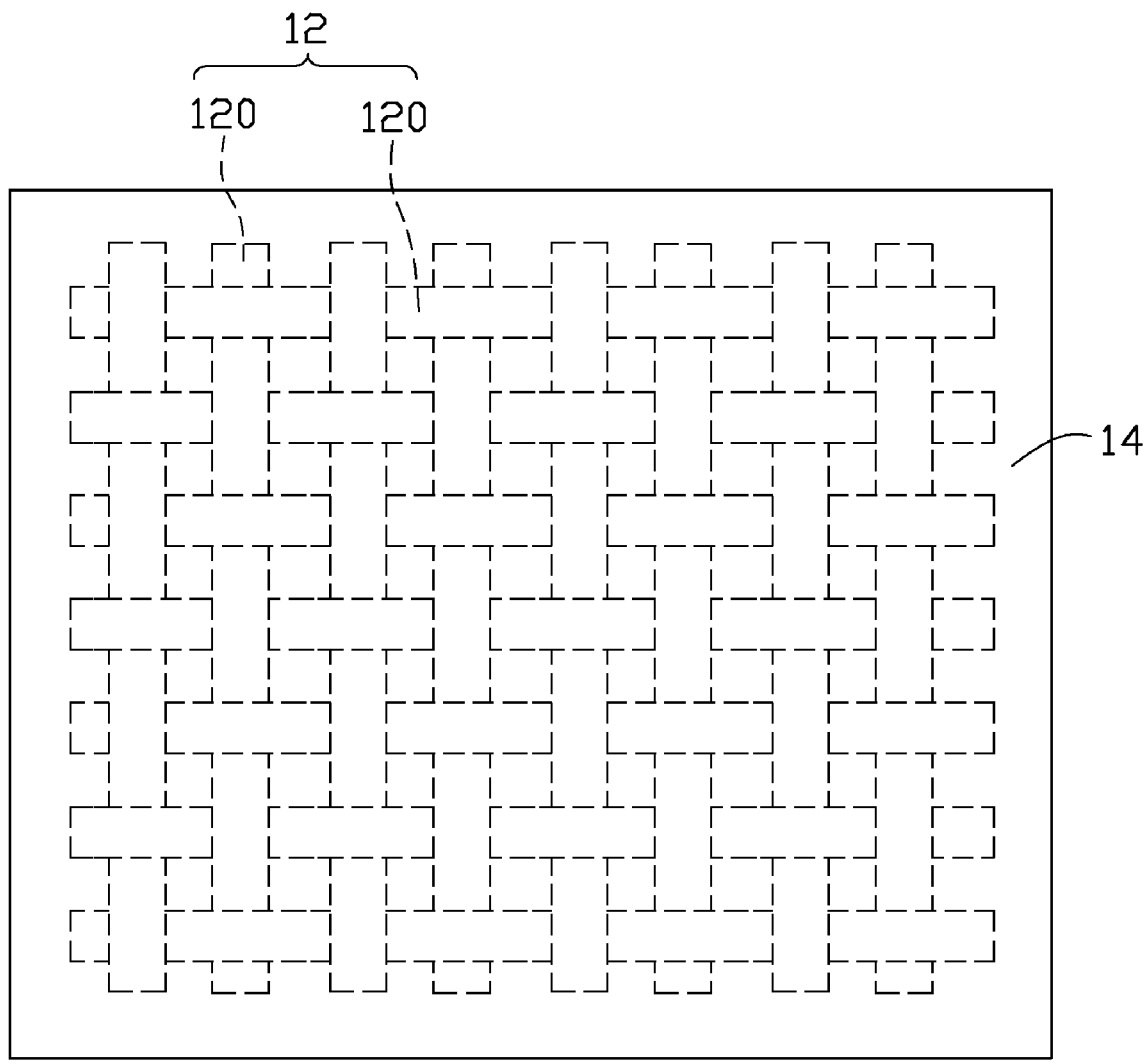
FIG. 7 is a schematic top view of another embodiment of a diaphragm including a plurality of carbon nanotube wire structures woven together.

Referring to FIG. 5, FIG. 6 and FIG. 7, the carbon nanotube structure can include a plurality of carbon nanotube wire structures 120. The plurality of carbon nanotube wire structures 120 can be approximately parallel to each other, crossing each other, or woven together, inside the diaphragm matrix 14. It is noteworthy that the plurality of carbon nanotube wire structure 120 can be woven to form a carbon nanotube cloth. The carbon nanotube cloth is a planar shaped carbon nanotube structure, which can be used in the diaphragm 10.

The carbon nanotube structure can have a size equal to the diaphragm matrix 14. The carbon nanotube structure can also be patterned, cut into different shapes, and arranged in the diaphragm matrix 14.

The reinforcing structure 12 can include the combination of the carbon nanotube film 122 and the carbon nanotube wire structure 120. The approximately parallel, crossed, or woven carbon nanotube wire structures 120 can be arranged on a surface of the carbon nanotube film 122 or sandwiched by two carbon nanotube films 122.

The carbon nanotube film can be a drawn carbon nanotube film, a flocculated carbon nanotube film, or a pressed carbon nanotube film.

A film can be drawn from a carbon nanotube array, to obtain a drawn carbon nanotube film. Examples of drawn carbon nanotube film are taught by U.S. Pat. No. 7,045,108 to Jiang et al., and US PGPub. 2008/0170982 to Zhang et al. The drawn carbon nanotube film includes a plurality of carbon nanotubes that are arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals attractive force. A small number of the carbon nanotubes are randomly arranged in the drawn carbon nanotube film, and has a small if not negligible effect on the larger number of the carbon nanotubes in the drawn carbon nanotube film arranged substantially along the same direction. The drawn carbon nanotube film is capable of forming a freestanding structure. The successive carbon nanotubes joined end to end by van der Waals attractive force realizes the freestanding structure of the drawn carbon nanotube film.

Some variations can occur in the orientation of the carbon nanotubes in the drawn carbon nanotube film. Microscopically, the carbon nanotubes oriented substantially along the same direction may not be perfectly aligned in a straight line, and some curve portions may exist. It is noteworthy that a contact between some carbon nanotubes located substantially side by side and oriented along the same direction cannot be totally excluded.

More specifically, the drawn carbon nanotube film can include a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity, and shape. The carbon nanotubes in the drawn carbon nanotube film are also substantially oriented along a preferred orientation. The thickness of the drawn carbon nanotube film can range from about 0.5 nm to about 100 μm. The width of the drawn carbon nanotube film relates to the carbon nanotube array that the drawn carbon nanotube film is drawn from. If the carbon nanotube structure consists of the drawn carbon nanotube film, and a thickness of the carbon nanotube structure is relatively small (e.g., smaller than 10 μm), the carbon nanotube structure can have a good transparency, and the transmittance of the light can reach to about 90%. The transparent carbon nanotube structure can be used to make a transparent diaphragm 10 with a transparent diaphragm matrix 14.

The carbon nanotube structure can include at least two stacked drawn carbon nanotube films. An angle between the aligned directions of the carbon nanotubes in the two adjacent carbon nanotube films can range from about 0° to about 90° ($0°\leq\alpha\leq90°$). Spaces are defined between two adjacent and side-by-side carbon nanotubes in the drawn carbon nanotube film. When the angle between the aligned directions of the carbon nanotubes in adjacent carbon nanotube films is larger than 0 degrees, the carbon nanotubes define a microporous structure. The carbon nanotube structure in an embodiment employing these films will have a plurality of micropores. A diameter of the micropores can be smaller than 10 μm. Stacking the carbon nanotube films will add to the structural integrity of the carbon nanotube structure.

The flocculated carbon nanotube film can include a plurality of long, curved, disordered carbon nanotubes entangled with each other. A length of the carbon nanotubes can be larger than 10 μm. In one embodiment, the length of the carbon nanotubes is in a range from about 200 μm to about 900 μm. Further, the flocculated carbon nanotube film can be isotropic. Adjacent carbon nanotubes are acted upon by van der Waals attractive force to obtain an entangled structure with micropores defined therein. The flocculated carbon nanotube film is very porous. Sizes of the micropores can be less than about 10 μm. Further, due to the carbon nanotubes in the carbon nanotube structure being entangled with each other, the carbon nanotube structure employing the flocculated carbon nanotube film has excellent durability, and can be fashioned into desired shapes with a low risk to the integrity of the carbon nanotube structure. The flocculated carbon nanotube film is freestanding due to the carbon nanotubes being entangled and adhered together by van der Waals attractive force therebetween. The thickness of the flocculated carbon nanotube film can range from about 1 μm to about 1 mm. In one embodiment, the thickness of the flocculated carbon nanotube film is about 100 μm.

The pressed carbon nanotube film can be a freestanding carbon nanotube film that is formed by pressing a carbon nanotube array down on the substrate. The carbon nanotubes in the pressed carbon nanotube film are arranged along a same direction or along different directions. The carbon nanotubes in the pressed carbon nanotube film can rest upon each other.

Adjacent carbon nanotubes are attracted to each other and are combined by van der Waals attractive force. An angle between a primary alignment direction of the carbon nanotubes and a surface of the pressed carbon nanotube film is about 0 degrees to approximately 15 degrees. The greater the pressure applied, the smaller the angle obtained. When the carbon nanotubes in the pressed carbon nanotube film are arranged along different directions, the carbon nanotube structure can be isotropic. Here, "isotropic" means the carbon nanotube film has properties substantially identical in all directions parallel to a surface of the carbon nanotube film. The thickness of the pressed carbon nanotube film ranges from about 0.5 nm to about 1 mm. The length of the carbon nanotubes can be larger than 50 µm. Clearances can exist in the carbon nanotube array, therefore, micropores exist in the pressed carbon nanotube film and defined by the adjacent carbon nanotubes. Examples of pressed carbon nanotube film are taught by US PGPub. 20080299031A1 to Liu et al.

It is noteworthy that, when the carbon nanotubes of the carbon nanotube structure are aligned along one direction or some predetermined directions, a larger strength and Young's modulus can be achieved along the direction of the carbon nanotubes in the carbon nanotube structure. Therefore, by arranging the carbon nanotube structure to set the carbon nanotubes therein aligned along a particular direction, the strength and Young's modulus of the diaphragm 10 along this direction can be improved.

The carbon nanotube wire can be untwisted or twisted. Treating the drawn carbon nanotube film with a volatile organic solvent can obtain the untwisted carbon nanotube wire. In one embodiment, the organic solvent is applied to soak the entire surface of the drawn carbon nanotube film. During the soaking, adjacent parallel carbon nanotubes in the drawn carbon nanotube film will bundle together, due to the surface tension of the organic solvent as it volatilizes, and thus, the drawn carbon nanotube film will be shrunk into an untwisted carbon nanotube wire. The untwisted carbon nanotube wire includes a plurality of carbon nanotubes substantially oriented along a same direction (i.e., a direction along the length direction of the untwisted carbon nanotube wire). The carbon nanotubes are parallel to the axis of the untwisted carbon nanotube wire. In one embodiment, the untwisted carbon nanotube wire includes a plurality of successive carbon nanotubes joined end to end by van der Waals attractive force therebetween. The length of the untwisted carbon nanotube wire can be arbitrarily set as desired. A diameter of the untwisted carbon nanotube wire ranges from about 0.5 nm to about 100 µm.

The twisted carbon nanotube wire can be obtained by twisting a drawn carbon nanotube film using a mechanical force to turn the two ends of the drawn carbon nanotube film in opposite directions. The twisted carbon nanotube wire includes a plurality of carbon nanotubes helically oriented around an axial direction of the twisted carbon nanotube wire. In one embodiment, the twisted carbon nanotube wire includes a plurality of successive carbon nanotubes joined end to end by van der Waals attractive force therebetween. The length of the carbon nanotube wire can be set as desired. A diameter of the twisted carbon nanotube wire can be from about 0.5 nm to about 100 µm.

The carbon nanotube wire is a freestanding structure. The length direction of the carbon nanotube wire has a larger strength and Young's modulus. Therefore, by arranging the carbon nanotube wire to set the carbon nanotube wire aligned along a particular direction, the strength and Young's modulus of the diaphragm 10 along this direction can be improved.

Referring to FIGS. 8 to 12, in another embodiment, the reinforcing structure 22 of the diaphragm 20 includes a carbon nanotube structure 120 and an additional reinforcing member 260. The carbon nanotube structure 120 and the additional reinforcing member 260 can be combined or composite together to form a composite reinforcing member. The material of the additional reinforcing member 260 is not carbon nanotubes. The carbon nanotube structure 120 can be at least one carbon nanotube wire structure and/or at least one carbon nanotube film as described above in the first embodiment. The reinforcing member 260 can include at least one of a linear shaped reinforcing member and a planar shaped reinforcing member.

Figure 8:
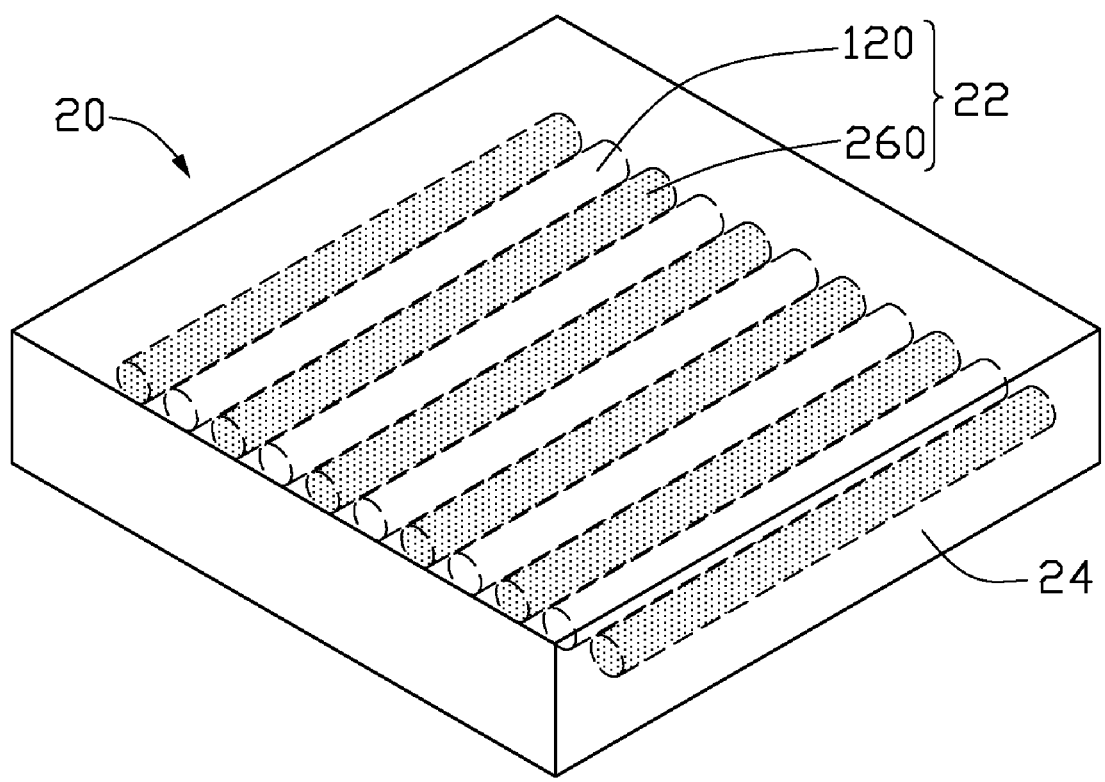
FIG. 8 is a schematic top view of another embodiment of a diaphragm including a plurality of carbon nanotube wire structures and a plurality of reinforcing wire structures parallel to each other.
Figure 9:
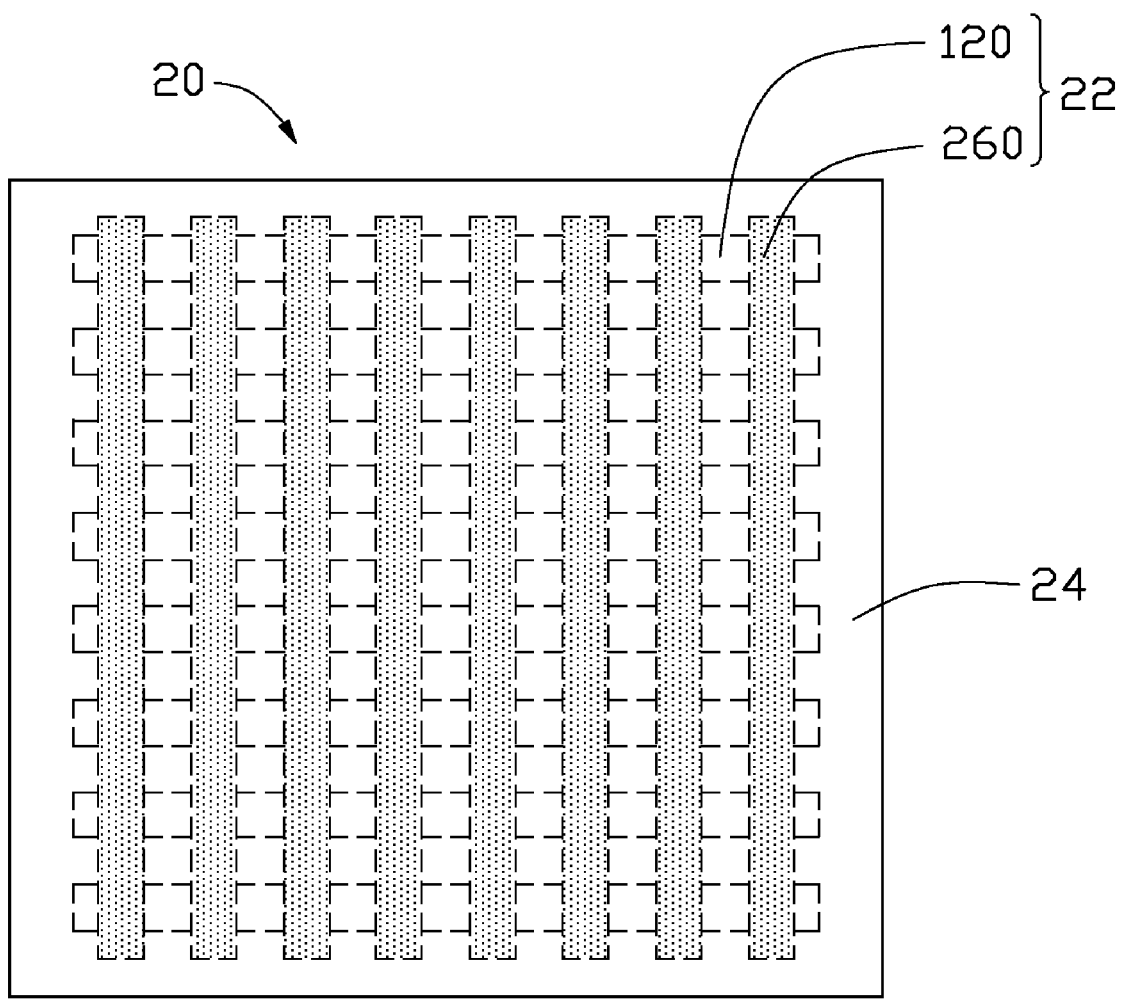
FIG. 9 is a schematic top view of another embodiment of a diaphragm including a plurality of carbon nanotube wire structures and a plurality of reinforcing wire structures crossing each other.
Figure 10:
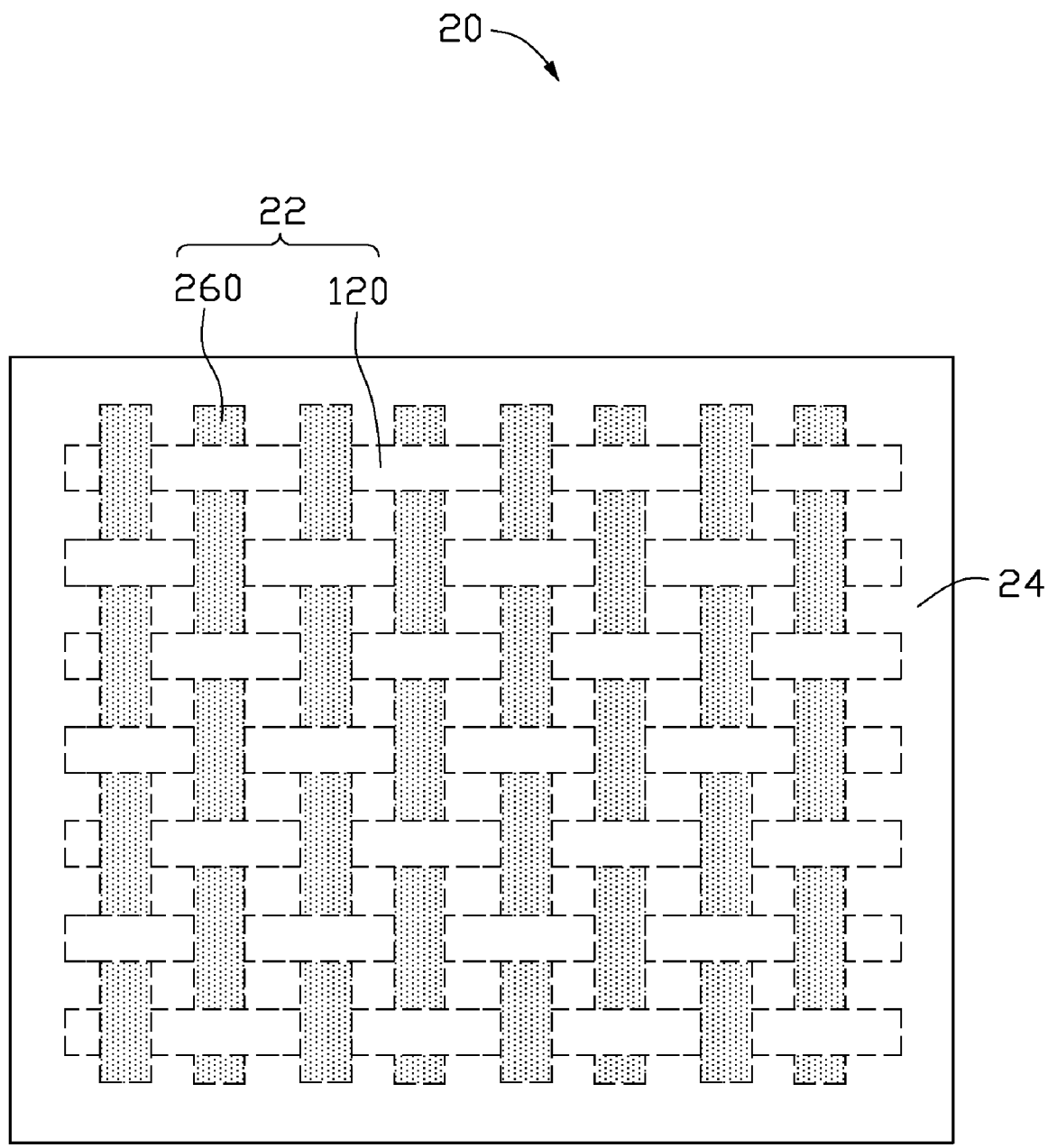
FIG. 10 is a schematic top view of another embodiment of a diaphragm including a plurality of carbon nanotube wire structures and a plurality of reinforcing wire structures woven together.

The reinforcing structure 22 can include a plurality of carbon nanotube wire structures 120 and a plurality of linear shaped reinforcing members 260. Referring to FIGS. 8 to 10, in the diaphragm 20, the plurality of the carbon nanotube wire structures 120 and the plurality of the linear shaped reinforcing members 260 can be substantially parallel to each other, crossed with each other, or woven together, to form the planar shaped reinforcing structure 22 inside the diaphragm matrix 24.

The linear shaped reinforcing member 260 can be at least one of cotton wires, fibers, polymer wires, and metal wires. The planar shaped reinforcing member can be at least one of polymer films, carbon fiber films, fabrics, and papers. The plurality of the carbon nanotube wire structures 120 and the plurality of the linear shaped reinforcing members 260 can be woven together to form a carbon nanotube composite cloth. The carbon nanotube composite cloth can be used as the reinforcing structure 22 in the diaphragm 20. The reinforcing structure 22 can include a combination of at least one of the carbon nanotube film and the carbon nanotube wire structure 120 and at least one of the linear shaped reinforcing member 260 and planar shaped reinforcing member. The carbon nanotube film and the linear shaped reinforcing member 260 or planar shaped reinforcing member can be stacked together. In other embodiments, the linear shaped reinforcing member 260 can be substantially parallelly arranged, crossed with each other, woven together, or coiled, and disposed on the surface of the carbon nanotube film.

Figure 11:
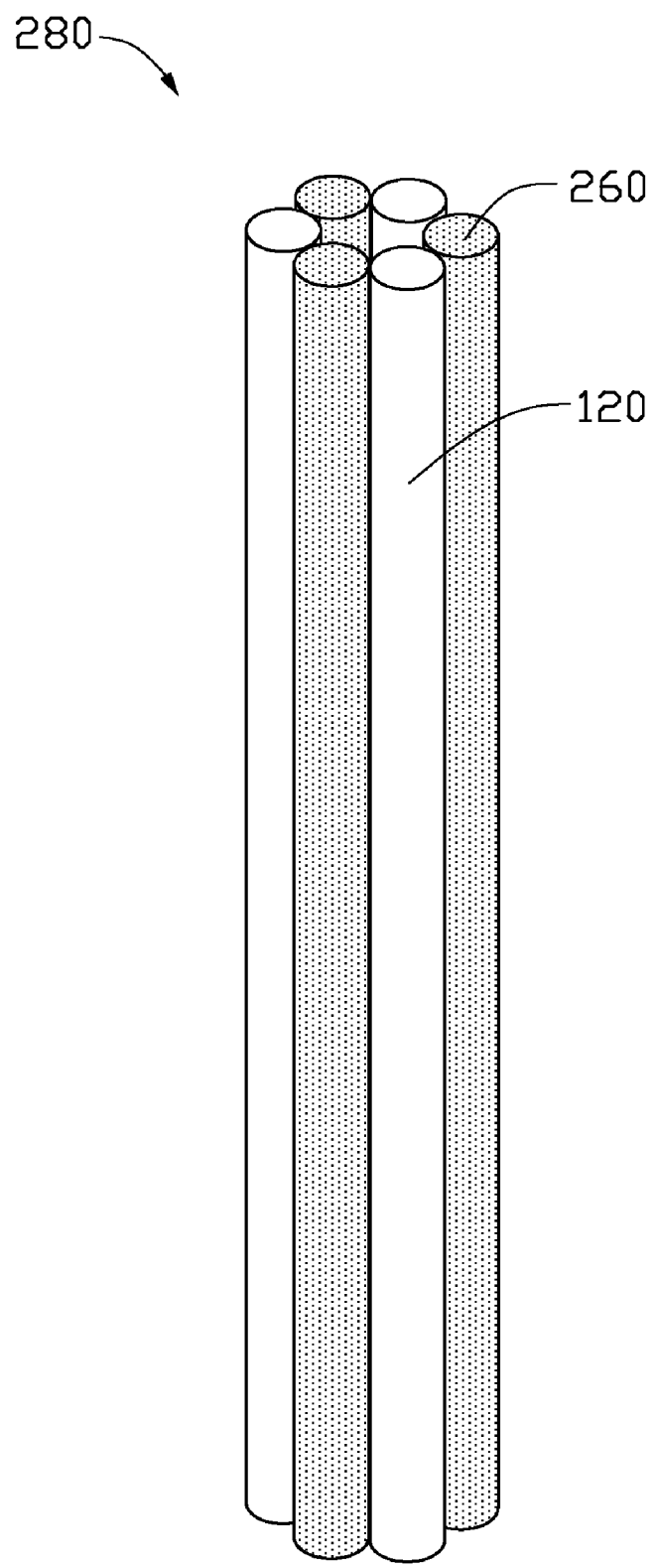
FIG. 11 is a schematic structural view of a carbon nanotube composite wire structure including a plurality of carbon nanotube wire structures and a plurality of reinforcing wire structures substantially parallel to each other.
Figure 12:
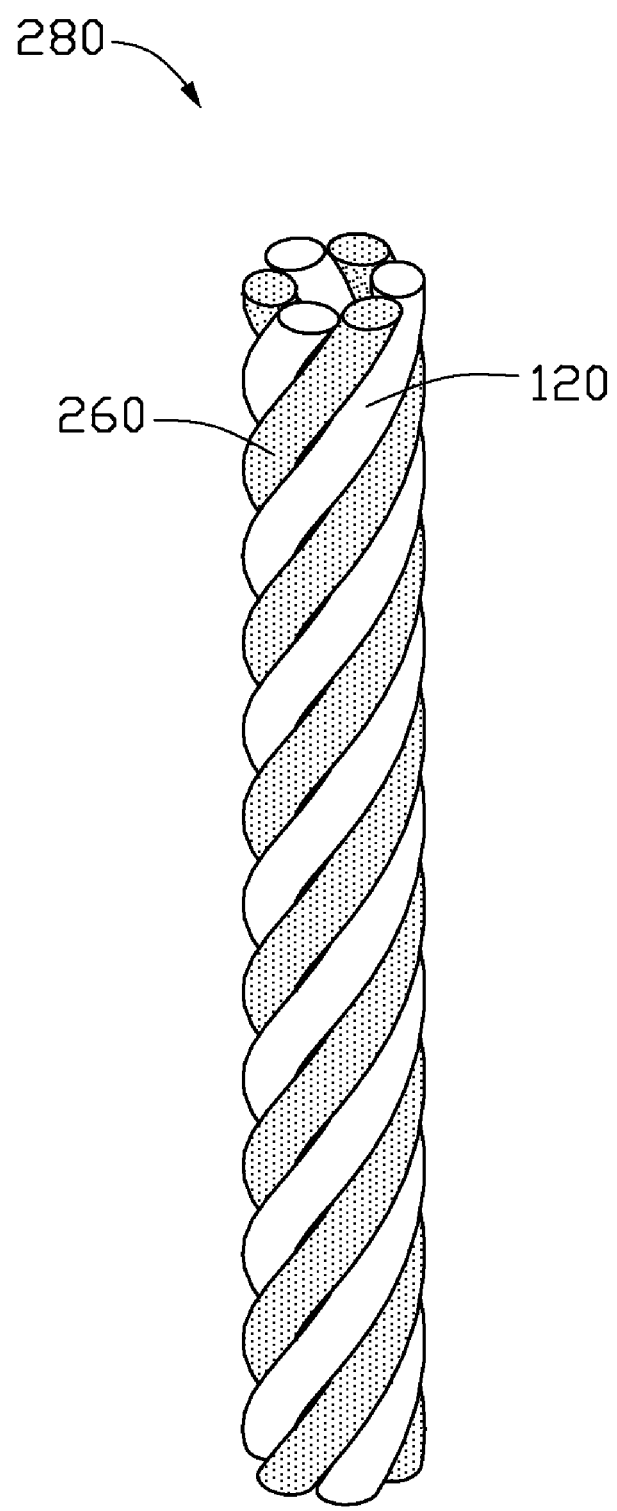
FIG. 12 is a schematic structural view of a carbon nanotube composite wire structure including a plurality of carbon nanotube wire structures and a plurality of reinforcing wire structures twisted together.

Referring to FIGS. 11 to 12, the reinforcing structure 22 can include at least one composite wire 280. The composite wire 280 can include at least one carbon nanotube wire structure 120 and at least one linear shaped reinforcing member 260. The carbon nanotube wire structure 120 and the linear shaped reinforcing member 260 can be substantially parallelly arranged to form a bundle-shaped structure or twisted together to form a twisted wire. The composite wire 280 can be arranged in the diaphragm matrix 24 in the same manner as the carbon nanotube wire structure 120 in the first embodiment.

In yet another embodiment, the reinforcing structure includes a carbon nanotube composite structure to replace the carbon nanotube structure in the above-described embodiments. The carbon nanotube composite structure is a composite of the carbon nanotube structure and other materials. The carbon nanotube structure can be at least one of the carbon nanotube film 122 or the carbon nanotube wire structure 120.

Figure 13:
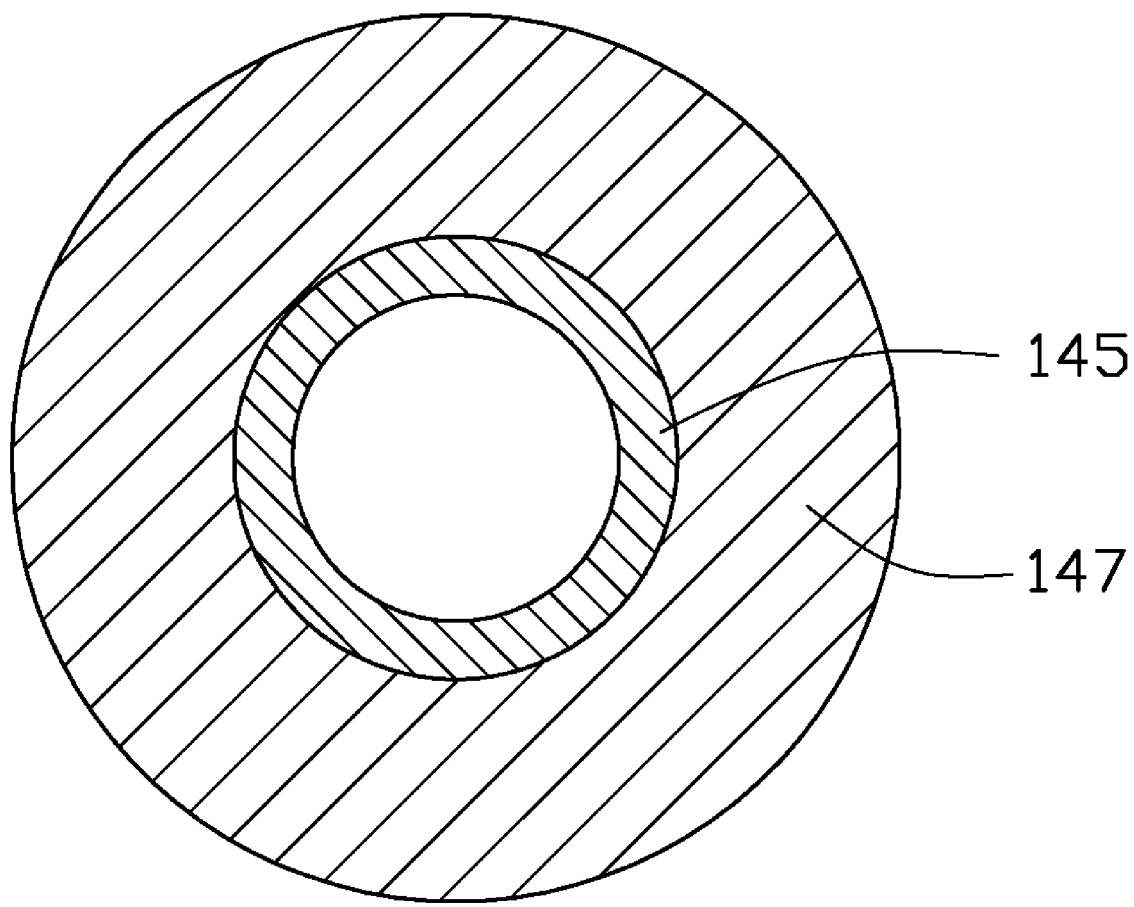
FIG. 13 is a cross-sectional view of a single carbon nanotube with a coating layer on the sidewall thereof.

Referring to FIG. 13, in the carbon nanotube composite structure, each carbon nanotube 145 is individually covered by a coating layer 147 formed from other materials. The other materials can be at least one of metal, diamond, boron carbide, or ceramic. The metal can be at least one of iron (Fe), cobalt (Co), nickel (Ni), palladium (Pd), titanium (Ti), copper (Cu), silver (Ag), gold (Au), platinum (Pt), or any combination thereof. The thickness of coating layer 147 can range from about 1 nanometer to about 100 nanometers. In one embodiment, the thickness of the coating layer 147 can be less than about 20 nanometers. The carbon nanotube wire structure and the carbon nanotube film have a plurality of micropores. Therefore, other materials can be formed on the outer surface of the side-wall of the individual carbon nanotube to form the coating layer 147 by a method such as PVD, CVD, evaporation, sputtering, electroplating, and chemical plating. A plurality of covering layers 147 can be formed on the outer surface of the carbon nanotube 145 in a concentric manner. The thickness of the covering layer 147 is very thin, therefore, a clearance may exist between the adjacent carbon nanotubes 145 to enable the material of the diaphragm matrix 14 infiltrating into the clearance.

It is noteworthy that although the diaphragms shown in FIGS. 1, 2, and 5 to 10 have a rectangular shape, the diaphragms can be cut into other shapes, such as circular, elliptical, or triangular, to adapt to the actual needs of the loudspeaker. The shape of the diaphragms is not limited.

The method for making the diaphragm of the present embodiments includes steps of:

S100, providing at least one freestanding reinforcing structure and a precursor of a diaphragm matrix, the reinforcing structure includes a plurality of carbon nanotubes; and S200, supplying a precursor into the reinforcing structure thereby compositing the diaphragm matrix with the reinforcing structure.

In step S100, the reinforcing structure can include at least one of the carbon nanotube film, carbon nanotube wire structure, and carbon nanotube composite structure.

In step S200, the precursor can be the material that forms the diaphragm matrix. The precursor can be in a liquid or a gaseous state. The precursor can be solidified or can be chemically reacted to form the diaphragm matrix.

When the precursor is a liquid, the step S200 can further include:

S210, immersing the reinforcing structure in the precursor; and

S220, solidifying the precursor to form the diaphragm matrix composited with the reinforcing structure.

In step S210, the liquid state precursor can be filled in a die or a mold to achieve the diaphragm matrix with a desired shape.

The material of the diaphragm matrix can be thermoplastic polymer or thermosetting polymer. The precursor can be the monomer of the thermoplastic polymer or the thermosetting polymer. In step S220, an initiator can be added into the monomer with the reinforcing structure therein, and the monomer can have an in situ polymerization reaction to form the solid polymer with the reinforcing structure therein.

The precursor can also be a solution of the polymer dissolved in a volatile solvent. In step S220, the solvent can be evaporated from the solution, thereby solidifying the precursor, to form the solid polymer with the reinforcing structure therein.

The precursor can be the thermoplastic polymer in a melted state. In step S220, the precursor can be cooled to form a solid polymer with the reinforcing structure therein.

The material of the diaphragm matrix can be metal, therefore, the precursor can be melted metal. The step S210 can be processed in vacuum or an inert gas. In step S220, the melted metal can be cooled to form a solid metal with the reinforcing structure therein.

The material of the diaphragm matrix can be ceramic, and the precursor can be a slurry of an inorganic nonmetal oxide material that formed the ceramic. In step S220, the inorganic nonmetal oxide material can be sintered in vacuum or inert gas, to form the ceramic with the reinforcing structure therein.

The material of the diaphragm matrix can be paper or cellulose, and the precursor can be paper pulp or cellulose pulp. In step S220, the paper pulp or cellulose pulp can be dehydrated, to form the paper or cellulose with the reinforcing structure therein. It is to be noted that the fibers in the paper pulp and the cellulose pulp may be small in size.

When the precursor is a gas, the step S200 can further include:

S212, disposing the reinforcing structure in the precursor gas; and

S222, depositing the precursor gas on the surface of the reinforcing structure to form the diaphragm matrix composited with the reinforcing structure.

The reinforcing structure includes a large amount of micropores, and the precursor gas can infiltrate into the inside of the reinforcing structure through the micropores, thereby deposing on the individual surface of each of the carbon nanotube.

When the material of the diaphragm matrix is the metal, a diamond, or a diamond like carbon, in step S222, the precursor gas can be formed and be deposited by a method such as vacuum evaporating, sputtering, CVD, and PVD.

When the precursor is a solid, the step S200 can further include:

S214, disposing one precursor on a surface of the reinforcing structure and another precursor on another surface of the reinforcing structure; and S224, pressing the precursors and the reinforcing structure together to form the diaphragm matrix composited with the reinforcing structure. In the pressing process, the precursors are pressed into the micropores of the reinforcing structure.

A cutting step can be done after the compositing step of S200 to form the diaphragm in the desired size and shape.

Before the compositing of step S200, the reinforcing structure is previously formed and set at a desired location of the precursor, where there are needs for increased strength and Young's modulus of the diaphragm. The carbon nanotube structure in the reinforcing structure includes uniformly distributed carbon nanotubes arranged in a desired manner. During compositing, the location and direction of the carbon nanotubes in the reinforcing structure can hardly change. Therefore, after compositing, the carbon nanotubes in the reinforcing structure can keep the original state thereof and the uniform distribution of the carbon nanotubes in the desired location of the diaphragm can be easily achieved by this in situ formation method. If the carbon nanotubes in the carbon nanotube structure are orderly arranged, in the diaphragm the carbon nanotubes will still be orderly arranged as in the original state at the desired location of the diaphragm. Compared to the conventional method, there is no need to disperse the carbon nanotubes in the diaphragm matrix. The carbon nanotubes can be set in only the desired locations of the diaphragm, such that in other locations of the diaphragm, there does not need to be any carbon nanotubes.

Figure 14:
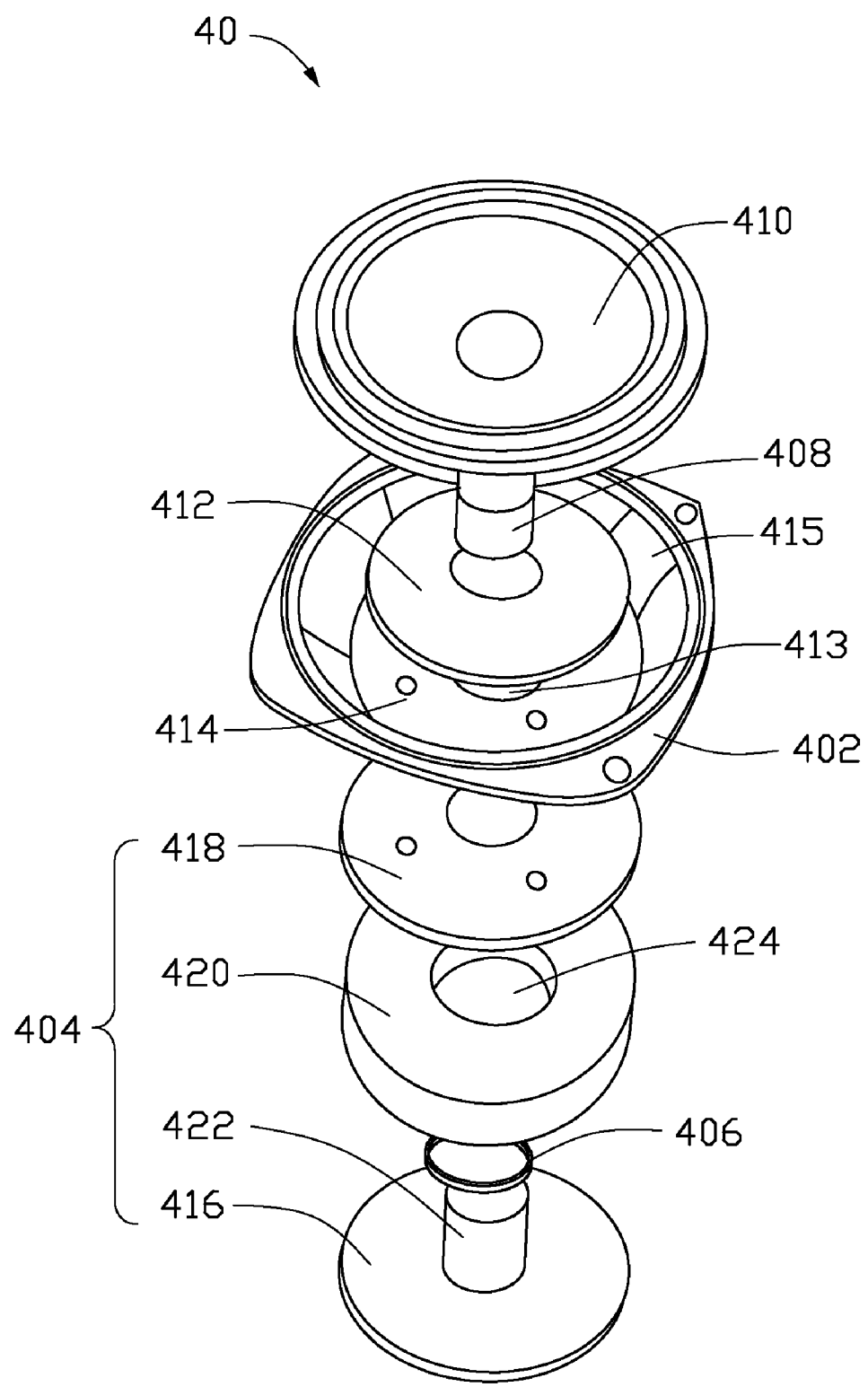
FIG. 14 is a schematic structural view of an embodiment of a loudspeaker.
Figure 15:
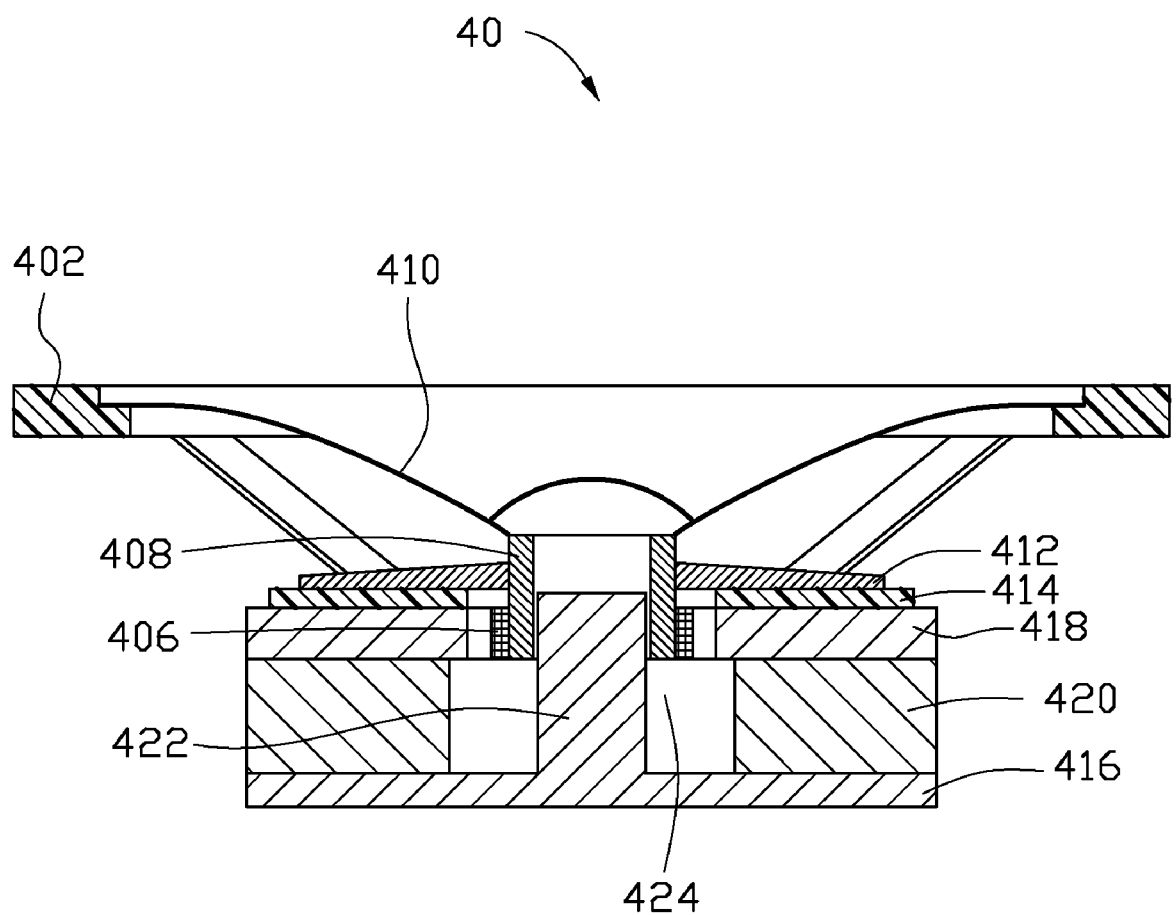
FIG. 15 is a cross-sectional view of the loudspeaker of FIG. 14.

Referring to FIGS. 14 and 15, a loudspeaker 40 using the diaphragm of the above-described embodiments, includes a frame 402, a magnetic circuit 404, a voice coil 406, a bobbin 408, a diaphragm 410, and a damper 412.

The frame 402 is mounted on an upper side of the magnetic circuit 404. The voice coil 406 is received in the magnetic circuit 404. The voice coil 406 is wound on the bobbin 408. An outer rim of the diaphragm 410 is fixed to an inner rim of the frame 402, and an inner rim of the diaphragm 410 is fixed to an outer rim of the bobbin 408 and placed in a magnetic gap 424 of the magnetic circuit 404.

The frame 402 is a truncated cone with an opening on one end and includes a hollow cavity 415 and a bottom 414. The hollow cavity 415 receives the diaphragm 410 and the damper 412. The bottom 414 has a center hole 413 to accommodate the center pole 422 of the magnetic circuit 404. The bottom 414 of the frame 402 is fixed to the magnetic circuit 404.

The magnetic circuit 404 includes a lower plate 416 having a center pole 422, an upper plate 418, and a magnet 420. The magnet 420 is sandwiched by the lower plate 416 and the upper plate 418. The upper plate 418 and the magnet 420 are both a circle, and define a cylinder shaped space in the magnetic circuit 404. The center pole 422 is accepted in the cylinder shaped space and passes through the center hole 413. The magnetic gap 424 is formed by the center pole 422 and the magnet 420. The magnetic circuit 404 is fixed on the bottom 414 at the upper plate 418.

The voice coil 406 wound on the bobbin 408 is a driving member of the loudspeaker 40. The voice coil 406 is made of conducting wire. When the electric signal is input into the voice coil 406, a magnetic field can be formed by the voice coil 406 by the variation of the electric signal. The interaction with the magnetic field caused by the voice coil 406 and the magnetic circuit 404 produce the vibration of the voice coil 406.

The bobbin 408 is light in weight and has a hollow structure. The center pole 422 is disposed in the hollow structure and is spaced from the bobbin 408. When the voice coil 406 vibrates, the bobbin 408 and the diaphragm 410 also vibrate with the voice coil 406 to produce sound.

The diaphragm 410 is a sound producing member of the loudspeaker 40. The diaphragm 410 can have a cone shape when used in the large sized loudspeaker 40. When the loudspeaker 40 has a smaller size, the diaphragm 410 can have a planar round shape or a planar rectangular shape.

The damper 412 is a substantially ring-shaped plate having radially alternate circular ridges and circular furrows. The damper 412 holds the diaphragm 410 mechanically. The damper 412 is fixed to the frame 402 and the bobbin 408. The damper 412 has a relatively large rigidity along the radial direction thereof, and a relatively small rigidity along the axial direction thereof, and restricts the voice coil to freely move up and down but not radially.

Furthermore, an external input terminal can be attached to the frame 402. A dust cap can be fixed over and above a joint portion of the diaphragm 410 and the bobbin 408.

It is to be understood that, the loudspeaker 40 is not limited to the above-described structure. Any loudspeaker using the present diaphragm is in the scope of the present disclosure.

It is to be understood that the above-described embodiments are intended to illustrate rather than limit the present disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

What is claimed is:

1. A diaphragm comprising:
   a diaphragm matrix; and
   at least one reinforcing structure composited with the diaphragm matrix, the at least one reinforcing structure comprising at least one freestanding carbon nanotube structure, the at least one freestanding carbon nanotube structure comprises a plurality of carbon nanotubes and a plurality of micropores defined by the plurality of carbon nanotubes, the diaphragm matrix being infiltrated into the plurality of micropores.

2. The diaphragm of claim 1, wherein the at least one freestanding carbon nanotube structure comprises at least one carbon nanotube film, at least one carbon nanotube wire structure, or a combination of the at least one carbon nanotube film and the at least one carbon nanotube wire structure.

3. The diaphragm of claim 2, wherein the at least one carbon nanotube film comprises a plurality of carbon nanotubes substantially parallel to a surface of the carbon nanotube film, the plurality of the carbon nanotubes being joined end-to-end by van der Waals attractive force therebetween and substantially aligned along a same direction.

4. The diaphragm of claim 2, wherein the at least one carbon nanotube wire structure comprises a carbon nanotube wire, a plurality of carbon nanotube wires substantially parallel to each other, or a plurality of carbon nanotube wires twisted together.

5. The diaphragm of claim 4, wherein the carbon nanotube wires comprises a plurality of carbon nanotubes joined end to end by van der Waals attractive force therebetween.

6. The diaphragm of claim 2, wherein the at least one carbon nanotube film comprises a plurality of carbon nanotube films stacked together or coplanar arranged.

7. The diaphragm of claim 2, wherein the at least one carbon nanotube wire structure has a spiral shape.

8. The diaphragm of claim 2, wherein the at least one carbon nanotube wire structure comprises a plurality of carbon nanotube wire structures substantially parallel to each other, crossed with each other, or woven together.

9. The diaphragm of claim 2, wherein the at least one carbon nanotube wire structure has a circular shape.

10. The diaphragm of claim 2, wherein the at least one carbon nanotube wire structure comprises a plurality of carbon nanotube wire structures arranged in a radial manner.

11. The diaphragm of claim 1, wherein the at least one freestanding carbon nanotube structure further comprises a coating layer individually located on each of the plurality of carbon nanotubes.

12. The diaphragm of claim 1, wherein a material of the coating layer is selected from the group consisting of metal, diamond, boron carbide, ceramic, and combinations thereof.

13. The diaphragm of claim 1, wherein the at least one reinforcing structure further comprises at least one reinforcing member.

14. The diaphragm of claim 13, wherein the at least one reinforcing member comprises at least one linear shaped reinforcing member, at least one planar shaped reinforcing member, or a combination of the at least one linear shaped reinforcing member and the at least one planar shaped reinforcing member.

15. The diaphragm of claim 14, wherein the at least one linear shaped reinforcing member is substantially parallel to, crossed with, or woven together with the at least one freestanding carbon nanotube structure.

16. The diaphragm of claim 14, wherein the at least one planar shaped reinforcing member is stacked with the at least one freestanding carbon nanotube structure.

17. The diaphragm of claim 1, wherein a material of the diaphragm matrix is selected from the group consisting of metal, diamond, ceramic, paper, cellulose, polymer, and combinations thereof.

18. A loudspeaker comprising:
    a magnetic circuit defining a magnetic gap;
    a bobbin located in the magnetic gap;
    a voice coil wound on the bobbin; and a diaphragm comprising an inner rim fixed to the bobbin a diaphragm matrix, and at least one reinforcing structure composited with the diaphragm matrix, the at least one reinforcing structure comprising at least one freestanding carbon nanotube structure, the at least one freestanding carbon nanotube structure comprises a plurality of carbon nanotubes and a plurality of micropores defined by the plurality of carbon nanotubes, the diaphragm matrix being infiltrated into the plurality of micropores.

* * * * *